Jan. 28, 1930.  E. J. WHIFFEN  1,745,285
APPARATUS FOR IMPREGNATING STRANDED ELEMENTS
Filed Feb. 17, 1928   3 Sheets-Sheet 1
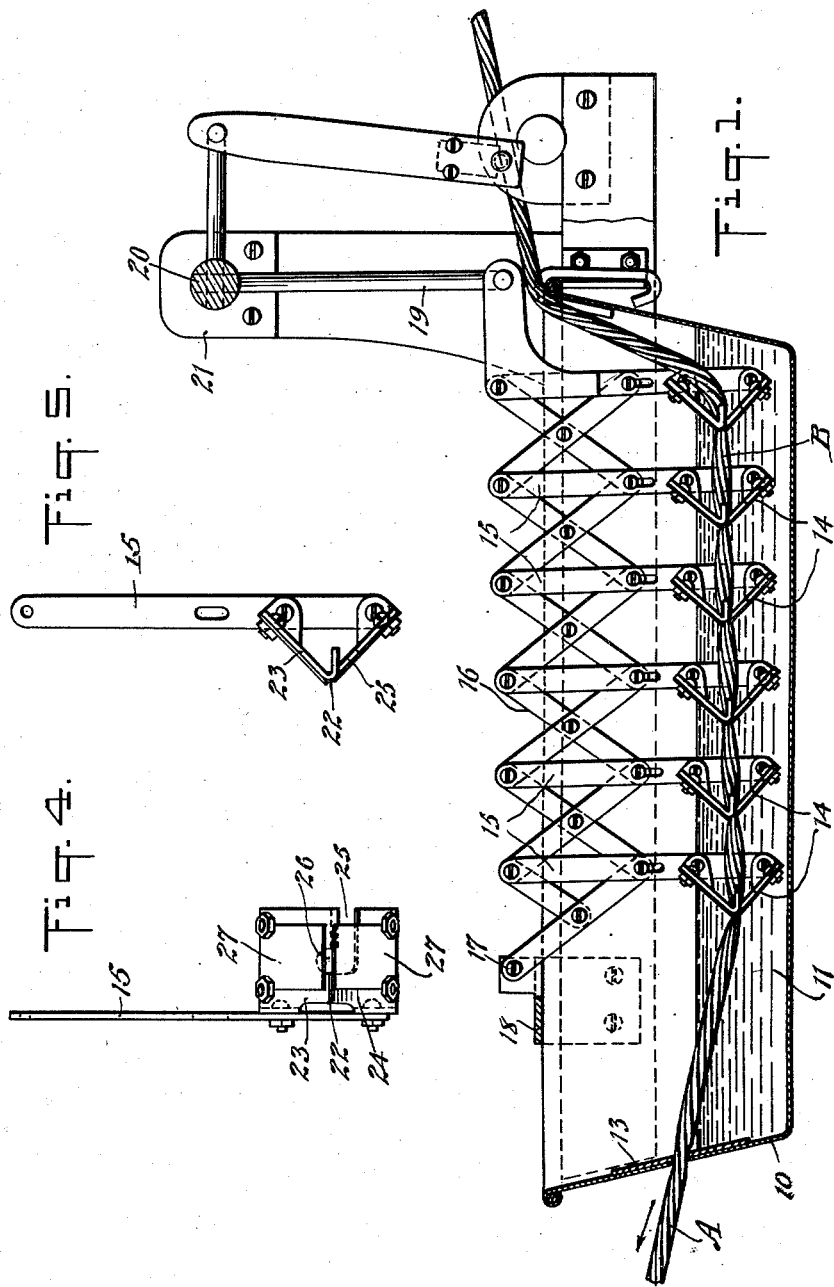

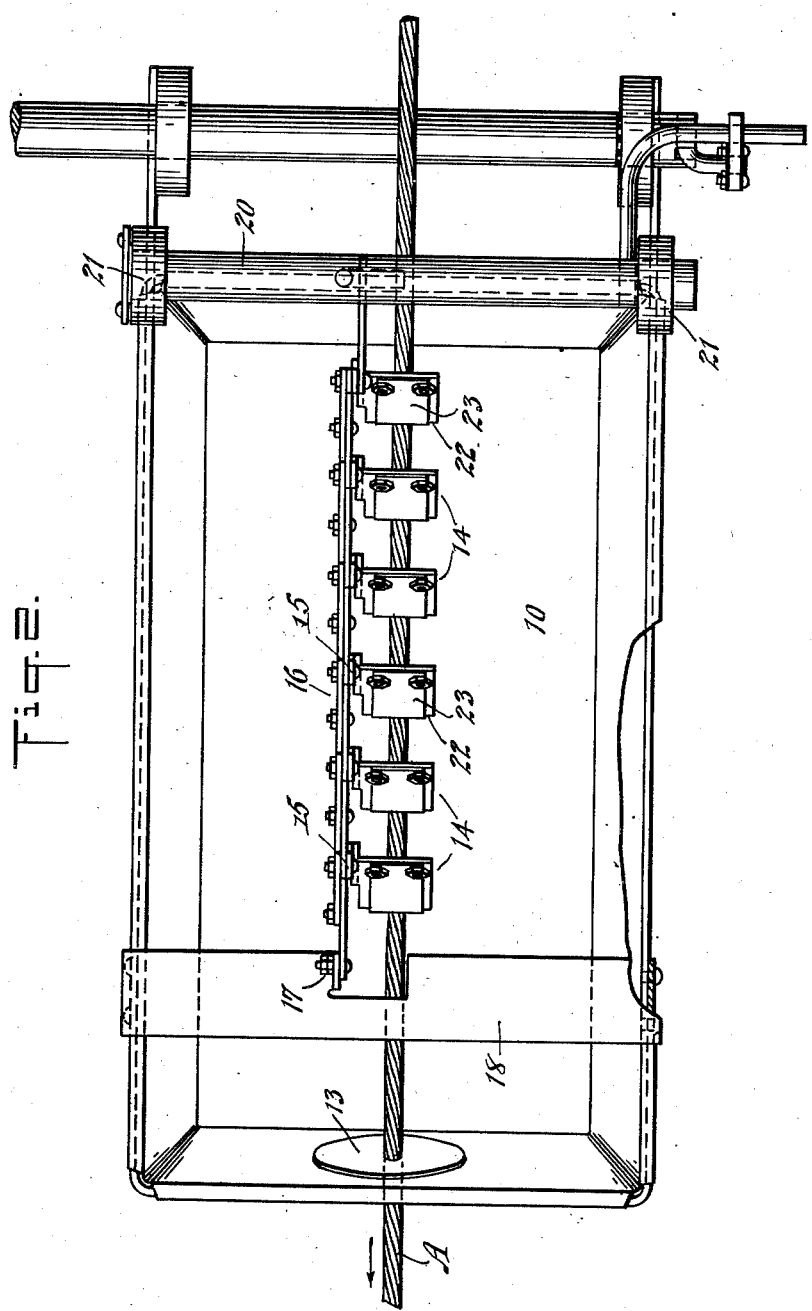

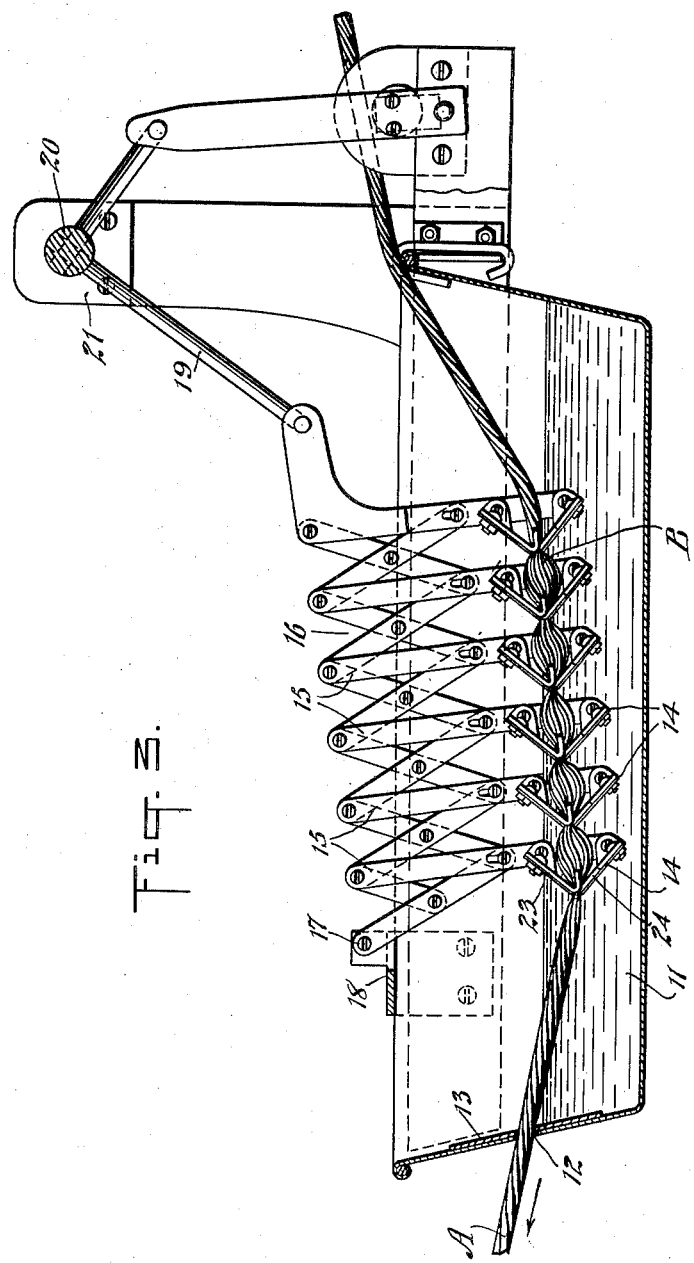

Patented Jan. 28, 1930

1,745,285

UNITED STATES PATENT OFFICE

EDWIN J. WHIFFEN, OF MOUNT VERNON, NEW YORK

APPARATUS FOR IMPREGNATING STRANDED ELEMENTS

Application filed February 17, 1928. Serial No. 255,041.

This invention relates to an apparatus for impregnating stranded elements with certain substances and comprehends means which facilitates a more thorough and rapid impregnation of said elements.

It is obvious that feeding of the material through a container with the element immersed in the substance contained therein, necessitates the use of a container of a large size to obtain the impregnation desired.

In order to reduce the size of the container required and thoroughly effect the impregnation of the element, the present invention comprehends the opening up of the strands of the element by a suitable means which does not materially retard the feeding speed of the element.

The invention furthermore comprehends in an apparatus for impregnating stranded elements, such as rope, twines, cords, or the like, a container for the impregnating substance, together with means immersed in the substance for gripping the element at a plurality of longitudinally spaced points, and mechanism for causing said means to be advanced toward each other and in the direction of feed of the element to effect the opening or spreading of the strands, which means when moved in the opposite direction, releases the element to obtain a fresh grip on a different portion of the element which is being impregnated.

The invention furthermore contemplates gripping devices which are constructed in such a manner as to facilitate the threading and engagement of the element therewith.

Other objects of the invention reside in the simplicity of construction and mode of operation of the apparatus, the economy with which the same may be produced and installed, and the general efficiency derived therefrom.

With the above recited and other objects in view, reference is had to the following description and accompanying drawings in which there is exhibited one example or embodiment of the invention while the appended claims define the actual scope of the invention.

In the drawings—

Figure 1 is a longitudinal sectional view through a container illustrating the strand-spreading means in separated condition;

Fig. 2 is a plan view of the device as shown in Fig. 1;

Fig. 3 is a view similar to Fig. 1, illustrating the strand spreading means in operative strand spreading position;

Fig. 4 is a detail front elevation of one of the gripper members;

Fig. 5 is a side view thereof.

Referring to the drawings by characters of reference, 10 designates a tank or receptacle in which the substance 11 of liquid or semi-liquid form is arranged. The tank or receptacle is provided with an outlet 12 slightly above the level of the substance 11, through which outlet the stranded element A is fed or taken off from the tank. At this point and within the tank, a suitable apertured scraper element 13 is arranged for removing the excess or residue of the substance 11 and for returning the same to the tank. The stranded element A is led to the tank over the opposite upper end and the same is trained through a plurality of longitudinally spaced gripper members 14, each of which is supported by a vertical bar 15.

In order to provide for alternate relative movement of the grippers toward and away from each other, the bars 15 are connected to a lazy-tong structure 16, one terminal of which is fulcrumed at 17 to a suitable support 18 and the opposite terminal of which lazy-tong structure is connected to an oscillatory arm 19, projecting radially from a rock shaft 20 arranged in suitable bearings 21. The rock shaft is rocked in any suitable manner to effect the distension and contraction of the lazy-tong structure. The gripper members 14 are constructed in such a manner that gripping of the element A is effected and spreading of the strands B of the element is caused when the grippers move relatively toward each other, while releasing and slippage of the grippers over the element is effected when the same are moved relatively away from each other. As illustrated, the grippers are composed of a substantially V-shaped head 22, cut, bent and formed to provide right-angularly disposed leaves 23 and 24, one of which is provided with an inwardly extending notch 25 from the side edge, which notch terminates in an offset terminal 26 intersecting the apex of the head. The outer face of each leaf 23 and 24 is formed with a resilient plate 27 attached to the leaves at a point adjacent their free edges, with the free edges of the plates disposed in slightly spaced relation at a point adjacent the apex of the head and in alinement with the notch terminal 26. It is obvious from this structure that the stranded element threaded through the notches 25 and into the offset terminals 26 of the notches, is engaged between the free edges of the resilient plates 27 for gripping thereby. It is also obvious that when the lazy-tong structure is opened or distended to move the grippers relatively apart, with the element A being drawn from the container in the direction indicated by the arrow, the grippers will freely slide in a reverse direction over the element. As the lazy-tong structure contracts to move the grippers toward each other and in the direction of the feed of the element, the grippers will grip the element at a plurality of points and in view of the fact that they are moved at a greater rate of speed than the feeding speed, the strands B will be spread apart to allow for a thorough and rapid impregnation of the substance 11 into the strands of the element.

It is, of course, understood that the grippers are disposed at a point where they engage the portion of the element which is immersed in the substance 11.

What is claimed is:

1. In an apparatus for impregnating stranded elements by moving the same through a bath of the impregnating substance, means for successfully gripping the immersed portion of the element at a plurality of longitudinally spaced points and means for moving the gripped points toward each other for opening up the strands of the element.

2. An apparatus for impregnating stranded elements, comprising means for moving the elements through a bath of impregnating substance, and grippers relatively movable toward and away from each other for successively engaging the immersed portion of the element at a plurality of spaced points to open up the strands.

3. An apparatus for impregnating stranded elements, comprising means for moving the elements through a bath of impregnating substance, and grippers relatively movable toward and away from each other for successively engaging the immersed portion of the element at a plurality of spaced points to open up the strands during their movement toward each other.

4. An apparatus for impregnating stranded elements, comprising means for moving the elements through a bath of impregnating substance, and grippers relatively movable toward and away from each other for successively engaging the immersed portion of the element at a plurality of spaced points to open up the strands during their movement toward each other and for obtaining a fresh grip on a succeeding portion of the element during the movement of the grippers away from each other.

5. An apparatus for impregnating stranded elements, comprising means for moving the elements through a bath of impregnating substance, and grippers relatively movable toward each other in the direction of movement of the element through the bath and away from each other in a direction opposite to the movement of the element through the bath for successively engaging the immersed portion of the element at a plurality of spaced points to open up the strands during the movement of the grippers toward each other.

6. An apparatus for impregnating stranded elements, comprising means for moving the elements through a bath of impregnating substance, and grippers relatively movable toward each other in the direction of movement and at a greater rate of speed than the speed of movement of the element through the bath, and away from each other in a direction opposite to the movement of the element through the bath for successively engaging the immersed portion of the element at a plurality of spaced points to open up the strands during the movement of the grippers toward each other.

7. An apparatus for impregnating stranded elements, comprising means for moving the elements through a bath of impregnating substance, a plurality of grippers through which the immersed portion of the element is trained, and mechanism for successively moving the grippers toward and away from each other to effect the opening up of the strands of the element.

8. An apparatus for impregnating stranded elements, comprising means for moving the elements through a bath of impregnating substance, a plurality of grippers through which the immersed portion of the element is trained, and mechanism for successively moving the grippers toward each other in the direction of movement of the element through the bath and away from each other in an opposite direction to the movement of the element through the bath for effecting the opening up of the strands of the element.

9. An apparatus for impregnating stranded elements, comprising means for moving the elements through bath of impregnating substance, a plurality of grippers through which the immersed portion of the element is trained and by which grippers the element is engaged at a plurality of spaced points, and mechanism for successively moving the grippers relatively toward each other in the direction of movement and at a greater rate of speed than the speed of movement of the element through the bath, for opening up the strands of the material, said mechanism serving to move the grippers away from each other in a direction opposite to the movement of the material through the bath for obtaining a fresh grip on a different portion of the element.

Signed at New York, in the county of New York, and State of New York, this 16th day of February, A. D. 1928.

EDWIN J. WHIFFEN.